(12) United States Patent
Toren

(10) Patent No.: US 7,250,184 B2
(45) Date of Patent: Jul. 31, 2007

(54) COMPOSITION AND METHOD FOR TENDERIZING MEAT

(75) Inventor: Jamie Francisco Toren, Highlands Ranch, CO (US)

(73) Assignee: Micro-Tender Industries, Denver, CO (US)

( * ) Notice: Subject to any disclaimer, the term of this patent is extended or adjusted under 35 U.S.C. 154(b) by 0 days.

(21) Appl. No.: 11/118,184

(22) Filed: Apr. 29, 2005

(65) Prior Publication Data

US 2006/0040017 A1  Feb. 23, 2006

Related U.S. Application Data

(60) Provisional application No. 60/603,618, filed on Aug. 23, 2004.

(51) Int. Cl.
*A23L 1/318* (2006.01)
(52) U.S. Cl. ............................ 426/56; 426/58; 426/63; 426/574

(58) Field of Classification Search ................ 426/56, 426/58, 63, 574, 59; 435/212
See application file for complete search history.

(56) References Cited

U.S. PATENT DOCUMENTS

| 6,149,950 A | 11/2000 | Ashie et al. |
| 6,537,598 B1 | 3/2003 | Teran |
| 6,814,989 B2 | 11/2004 | Teran |

FOREIGN PATENT DOCUMENTS

WO  89/11227  * 11/1989

OTHER PUBLICATIONS

Wada et al. "The effects of pressure treatments with kiwi fruit protease on adult cattle semitendinosus muscle", Food Chemistry, vol. 78, (2002), p. 167-171.*

* cited by examiner

*Primary Examiner*—Keith Hendricks
(74) *Attorney, Agent, or Firm*—Dale B. Halling

(57) ABSTRACT

A method of tenderizing meat comprising providing an amount of meat and treating the meat with a composition comprising an enzyme mixture consisting of bromelin, ficin, papain and/or actinidin.

14 Claims, No Drawings

COMPOSITION AND METHOD FOR TENDERIZING MEAT

RELATED APPLICATIONS

The present invention claims priority on provisional patent application Ser. No. 60/603,618, filed on Aug. 23, 2004, entitled "Composition and Method for Tenderizing Meat".

BACKGROUND

A large portion of commercially raised meat is limited in value because conventional preparation methods result in meat that is unacceptably tough and dry. A variety of methods have been used to tenderize naturally tough meat, such as mechanically interrupting the muscle fibers of the meat. However, none of these methods have produced a meat product that can be cooked using conventional preparation methods, and that results in a post-preparation product that is consistently tender and suitable for human consumption. Note that the word meat as used herein means any animal protein excluding liquid proteins such as blood.

Therefore, it would be useful to have a method of tenderizing meat so that the meat can be cooked using conventional methods, and that results in a post-preparation meat product that is consistently tender and suitable for human consumption.

SUMMARY

According to one embodiment, there is provided a method of tenderizing meat, the method comprising providing an amount of meat, and treating the meat with a composition comprising an enzyme mixture where the enzyme mixture consists of about 94% bromelin having 20-1800 MCUs (Milk Clotting Units), around 5% ficin having 10-1200 MCUs and about 1% papain having 10-1500 MCUs. In another embodiment, the enzyme mixture consists of about 93% bromelin having 20-1800 MCUs, around 5% ficin having 10-1200 MCUs, about 1% papain having 10-1500 MCUs and about 1% actinidin having 10-1800 MCUs.

In another embodiment, the meat provided is an amount between about 0.1 kg and about 10,000 kg. In yet another embodiment, the meat provided is an amount between about 100 kg and 6000 kg.

In one embodiment, the ratio of weight of the enzyme composition to the total weight of the meat being treated with the composition is between about 1:5000 and about 1:600,000.

In one embodiment, a solution of the enzymes is injected that contains water and the enzyme composition. The solution is injected at between 4% to 25% of the weight of the animal protein being injected.

In another embodiment, the method further comprises tumbling the treated meat at a pressure and rotation speed selected to more evenly distribute the enzyme mixture throughout the treated meat. In a preferred embodiment, the pressure is a near vacuum. In another preferred embodiment, the rotation speed is about between about 10 and about 15 revolutions per minute.

In a preferred embodiment, the method further comprises exposing the treated meat to a relative vacuum in a closed container, such as a polymer bag. In a particularly preferred embodiment, the relative vacuum is about −1.5 bar.

In one embodiment, the method further comprises packaging the treated meat in a commercial package. In a preferred embodiment, the method further comprises cooking the treated meat. In a particularly preferred embodiment, cooking the treated meat comprises raising the core temperature of the treated meat until its core temperature is heated to the recommended temperature range for the type of meat.

In another embodiment, the method further comprises distributing the treated meat to an intermediate wholesale or retail establishment.

DESCRIPTION

According to one embodiment of the present invention, there is provided an enzyme mixture that can be used to treat meat to produce a product that can be cooked using conventional methods, and that results in a post-preparation product that is consistently tender. The enzyme mixture comprises three and/or four enzymes: bromelin, ficin, papain and/or actinidin. Actinidin may be obtained from New Zealand Pharmaceuticals. According to another embodiment of the present invention, there is provided a method of tenderizing meat to produce a product that can be cooked by conventional methods, and that results in a post-preparation product that is consistently tender. The method comprises treating the meat with an enzyme mixture according to the present invention. The enzyme mixture and method will now be disclosed in detail.

As used in this disclosure, "consumer" refers to the individual or enterprise that cooks the treated meat for eventual human consumption, and includes an individual at home, and a cook in a restaurant or a food service enterprise, among others as will be understood by those in the art with reference to this disclosure.

As used in this disclosure, percent amounts are given in percent by weight of total weight.

In one embodiment, the present invention is an enzyme mixture that can be used to treat meat according to the present invention. The enzyme mixture comprises three and or four proteolytic enzymes, and can comprise one or more than one additional substance. Each enzyme in the enzyme mixture has a specific activation temperature and a deactivation temperature. When used to treat meat together and in the proper ratios, cooking the meat causes the enzymes to work synergistically to break down the substance of the meat and results in a post-preparation product that is consistently tender and suitable for human consumption.

In a preferred embodiment, the enzyme mixture consists of the three and/or four enzymes bromelin, ficin, papain and or actinidin. In a particularly preferred embodiment, three enzymes are combined in specific ratios. Suitable enzymes can be obtained from All American Seasonings, Inc., Denver, Colo. US. Usually bromelin, when used, is in a concentration less than 97% by weight of the enzyme mixuture.

In a preferred embodiment, the enzyme mixture consists of about 94% bromelin having 20-1800 MCUs (Milk Clotting Units), around 5% ficin having 10-1200 MCUs and about 1% papain having 10-1500 MCUs. In another embodiment, the enzyme mixture consists of about 93% bromelin having 20-1800 MCUs, around 5% ficin having 10-1200 MCUs, about 1% papain having 10-1500 MCUs and about 1% actinidin having 10-1800 MCUs.

More generally, actinidin may be used as a wildcard or substitute for any of the other three enzymes (Papain, Bromelin, and Ficin) partially or completely replacing the other three enzymes. At the enzyme it is replacing stated percentage of enzyme composition and specified MCUs.

In one embodiment, the ratio of weight of the enzyme composition to the total weight of the meat being treated with the composition is between about 1:5000 and about 1:600,000.

In one embodiment, a solution of the enzymes is injected that contains water and the enzyme composition, but may also include one or more substances as stated earlier. The solution is injected at between 4% to 25% of the weight of the animal protein being injects In another embodiment of the present invention, there is provided a method of tenderizing meat to produce a product that can be cooked by conventional methods, and that results in a post-preparation product that is consistently tender. In summary, the method comprises at least the following two steps. First, a suitable type or grade of meat is provided. As used in this disclosure, the terms "type" and "grade" are interchangeable. Second, the suitable grade of meat is treated with an enzyme mixture according to the present invention. The suitable grade of meat provided is preferably meat that potentially would be undesirably tough after being cooked by conventional methods. The meat can be partially or completely skinned, boned or both. Additionally, waste products, such as connective tissue, or excess fat can be removed. The amount of meat provided can be any amount that can be handled by equipment available to perform the method of the present invention. For example, the amount can be between about 0.1 kg and about 10,000 kg. In a preferred embodiment, the amount is between about 100 kg and about 6000 kg.

Treatment of the meat with an enzyme mixture according to the present invention can be accomplished using a variety of methods. In a preferred embodiment, the meat is injected with a solution containing the enzyme mixture using commercially available injection equipment, such as the Fomaco Injector, Robert Reiser Co., Canton, Mass. US, though any suitable injection equipment can be used as will be understood by those in the art with reference to this disclosure. Preferably, the sites of injection are less than about 7.5 cm apart. In a particularly preferred embodiment, the meat is injected with a solution containing the composition.

In one embodiment, the ratio of weight of the enzyme composition to the total weight of the meat being treated with the composition is between about 1:5000 and about 1:600,000.

For example, meat that is to be cooked by grilling or microwaving can be injected with a solution. Similarly, meat that is to be cooked by a convention gas or an electric oven can be injected a solution of the enzymes.

In one embodiment, a solution of the enzymes is injected that contains water and the enzyme composition. The solution is injected at between 4% to 25% of the weight of the animal protein being injected.

In another preferred embodiment, the method further comprises tumbling the treated meat at a pressure and rotation speed selected to more evenly distribute the enzyme mixture or composition throughout the treated meat. The pressure and rotation speed are chosen so as to separate the fibers of treated meat without shredding or tearing apart the fibers permanently, that is, while retaining the fibers' structural cohesiveness. In a preferred embodiment, the tumbling is performed in a near vacuum at between about 10 and about 15 revolutions per minute for between about 15 and about 30 minutes. The near vacuum combined with the rotation separates the muscle fibers of the treated meat allowing more rapid and uniform distribution of the enzymes. Preferably, the treated meat is tumbled in a finned vacuum tumbler with a central sealable chamber that can be operated at a specific pressure and rotation speed such as the Model LT30, available from Lance Industries, Allenton, Wis. US or a similar device, as will be understood by those with skill in the art with reference to this disclosure.

In another preferred embodiment, the method further comprises exposing the treated meat to a relative vacuum in a closed container. Containers are selected that can be sealed to maintain a vacuum for preserving the meat. In one embodiment, the container is a polymer bag, such as available from W. R. Grace & Co., Sioux City, Iowa. After selecting a suitable container, the treated meat is placed in the container and a vacuum is applied. In a preferred embodiment, the vacuum is a near vacuum of about −1.5 bar. The container tends to assume the shape of the meat upon application of the vacuum.

In another preferred embodiment, the method further comprises packaging the treated meat in a suitable commercial package for shipping and storage, or in a suitable commercial package for retail distribution to a consumer, or both. Packaging can include labeling as required by local laws and branding with a trademark or trade name and can include decorative wrapping for marketing purposes.

In another preferred embodiment, the method further comprises cooking the treated meat before packaging. The cooking can be done by any suitable method as will be understood by those in the art with reference to this disclosure. For example, the treated meat can be placed in an oven or in a hot water bath. Preferably, the treated meat is cooked until its core temperature heated to the recommended temperature range for the type of meat. If the treated meat is cooked before packaging, then the cooked treated meat is preferably cooled also before packaging.

The treated meat can be distributed to an intermediate wholesale or retail establishment, and thereby to a consumer, or can be distributed directly to a consumer. After distribution, the consumer cooks the treated meat using conventional methods, or if the product has been cooked prior to packaging, reheats the product if desired or consumes the product without reheating. For example, the treated meat can be removed from the packaging and container and can be barbecued, grilled, microwaved, prepared on a stove top or in an oven, or cooked using another conventional method, and the post-preparation product is consistently tender and suitable for human consumption.

Enzymes for use in the present invention may comprise wild-type or mutant enzymes. The enzymes may be isolated from their cell of origin or may be recombinantly produced using conventional methods well-known in the art. It will be understood that each of the reaction conditions (such as, e.g., concentration of enzyme, ratio of enzyme:meat, mode of contacting, pH, temperature, and time) may be varied, depending upon the source of meat and/or enzyme and the degree of tenderization that is required. It will further be understood that optimization of the reaction conditions may be achieved using routine experimentation by establishing a matrix of conditions and testing different points in the matrix.

Although the present invention has been discussed in considerable detail with reference to certain preferred embodiments, other embodiments are possible. Therefore, the scope of the appended claims should not be limited to the description of preferred embodiments contained in this disclosure.

What is claimed is:

1. A method of tenderizing meat, the method comprising:
   a) providing a suitable amount of meat; and b) treating the meat with a composition comprising an enzyme mixture; and where the enzyme mixture has at least three proteolytic enzymes wherein the enzyme mixture includes actinidin.

2. The method of claim 1, wherein the enzymes are selected from the group consisting of: bromelin, ficin, and papain.

3. The method of claim 1, where the enzyme mixture consists of about 93% bromelin, about 5% ficin, about 1% papain and about 1% actinidin.

4. The method of claim 3, wherein the bromelin has a milk clotting unit range between 20-1800.

5. The method of claim 3, wherein the ficin has a milk clotting unit range between 10-1200.

6. The method of claim 3, wherein the papain has a milk clotting unit range between 10-1500.

7. The method of claim 3, wherein the actinidin has a milk clotting unit range between 10-1800.

8. The method of claim 1, where the composition used to treat the meat comprises between about 1:5000 to 1:600,000 by weight of the enzyme mixture to the meat.

9. A method of tenderizing meat, the method comprising:

a) providing a suitable amount of meat; and b) treating the meat with a composition comprising an enzyme mixture; and where the enzyme mixture has at least three proteolytic enzymes and one of the enzymes is bromelin with a milk clotting unit range between 20-1800 and the enzyme mixture consists of about 93% bromelin, about 5% ficin, about 1% papain and about 1% actinidin.

10. The method of claim 9, wherein the ficin has a milk clotting unit range between 10-1200.

11. The method of claim 9, wherein the papain has a milk clotting unit range between 10-1500.

12. The method of claim 9, wherein the actinidin has a milk clotting unit range between 10-1800.

13. The method of claim 9, where the composition used to treat the meat comprises between about 1:5000 to 1:600,000 by weight of the enzyme mixture to the meat.

14. A method of tenderizing meat, the method comprising:

a) providing a suitable amount of meat; and b) treating the meat with a composition comprising an enzyme mixture; and where the enzyme mixture includes actinidin and at least two other enzymes selected from the group consisting of: bromelin, ficin, and papain.

* * * * *

UNITED STATES PATENT AND TRADEMARK OFFICE
CERTIFICATE OF CORRECTION

PATENT NO. : 7,250,184 B2  Page 1 of 1
APPLICATION NO. : 11/118184
DATED : July 31, 2007
INVENTOR(S) : Jamie Francisco Teran It is certified that error appears in the above-identified patent and that said Letters Patent is hereby corrected as shown below:

On The Title Page, Item (75)
Inventors name is misspelled. Should be --Jamie Francisco Teran--.

Signed and Sealed this

Thirteenth Day of November, 2007

JON W. DUDAS
*Director of the United States Patent and Trademark Office*